(12) United States Patent
Paproski (10) Patent No.: US 8,132,998 B2
(45) Date of Patent: Mar. 13, 2012

(54) TRAILER RAMP SYSTEM

(76) Inventor: Vern Paproski, Saskatoon (CA)

( * ) Notice: Subject to any disclaimer, the term of this patent is extended or adjusted under 35 U.S.C. 154(b) by 1049 days.

(21) Appl. No.: 11/564,888

(22) Filed: Nov. 30, 2006

(65) Prior Publication Data

US 2008/0131245 A1 Jun. 5, 2008

(51) Int. Cl.
*B60P 1/04* (2006.01)

(52) U.S. Cl. ........................................... 414/480

(58) Field of Classification Search .................. None
See application file for complete search history.

(56) References Cited

U.S. PATENT DOCUMENTS

| | | | |
|---|---|---|---|
| 5,598,595 A * | 2/1997 | Flinchum | 14/69.5 |
| 6,394,734 B1 * | 5/2002 | Landoll et al. | 414/480 |
| 7,547,178 B1 * | 6/2009 | Dierks et al. | 414/484 |
| 2002/0081185 A1 * | 6/2002 | Hedtke | 414/537 |

* cited by examiner

*Primary Examiner* — Saul Rodriguez
*Assistant Examiner* — Willie Berry, Jr.
(74) *Attorney, Agent, or Firm* — Ryan W. Dupuis; Kyle R. Satterthwaite; Ade & Company Inc.

(57) ABSTRACT

A ramp member is pivotally supported at the rear of a flat bed trailer for pivotal movement between a loading position extending from the flat bed to the ground and a storage position supported on the trailer bed, through an intermediate position between the loading position and the storage position. First and second torsion members are arranged such that at least one of the torsion members biases the ramp member from each of the loading and storage positions towards the intermediate position. The torsion members permit substantially a full weight of the ramp member to be counter-balanced through its full range of motion so that a single ramp member spanning a full width of a rear end of the trailer in the lateral direction can be manually displaced by a single operator.

19 Claims, 4 Drawing Sheets

TRAILER RAMP SYSTEM

FIELD OF THE INVENTION

The present invention relates to a ramp system for being pivotally mounted on a flat bed trailer in which a ramp includes a lift assist for assisting in lifting the ramp from a loading position relative to the trailer, and more particularly the present invention relates to a lift assist for a trailer ramp comprising a torsion member.

BACKGROUND

A common construction of heavy duty trailers involves an elongate flat bed deck supported on wheels in a suitable manner for rolling movement in a forward direction of a towing vehicle. A hitch connector at a forward end of the trailer secures the trailer to the towing vehicle. Ramps are typically pivotally coupled at a rear end of the trailer for loading objects onto the trailer deck surface. Typically there are two ramps spaced apart at an adjustable lateral spacing for accommodating the various wheel spacings of vehicles to be loaded onto the trailer deck surface. The ramps are typically hinged and rotate between a transport position carried on the bed of the trailer and a loading position in which the ramps provide a declining extension of the bed surface of the trailer extending from the rear of the trailer to the ground. Both the frame of the trailer and of the ramps must be designed to carry a substantial amount of weight during loading and unloading operations and for carrying various objects and vehicles on the trailer, so that the resulting frames of the ramps may be quite heavy, for example being between 100 and 150 pounds for each section of the ramp. It is common for multiple users to be required for manually lifting the ramps and rotating them through approximately 180 degrees of rotation between the loading position and the transport position even when the ramps are provided in plural sections.

Various prior art designs incorporate springs at the hinge coupling the ramps to the deck frame however the biasing provided by conventional spring designs typically limit the amount of weight to be carried so that even when forming the ramps in individual sections to reduce the weight thereof, a considerable weight remains to be manually lifted. Furthermore forming the ramps as separate spaced apart sections is somewhat undesirable as there is a danger of a vehicle slipping off the sides of the narrow individual ramp sections during a loading or unloading operation.

SUMMARY OF THE INVENTION

According to one aspect of the invention there is provided a ramp system for a flat bed trailer having a deck frame, the ramp comprising;

a ramp member;

a hinge pivotally coupling the ramp member to the trailer for pivotal movement about a hinge axis between a loading position in which the ramp member extends between the deck frame and the ground and a storage position in which the ramp member is raised upwardly in relation to the loading position, through an intermediate position in which the ramp member is between the loading position and the storage position;

at least one torsion member having a respective torsion axis extending in a longitudinal direction of the torsion member between opposed ends of the torsion member;

said at least one torsion member being arranged to be supported such that the torsion axis of said at least one torsion member extends generally in a direction of the hinge axis; and said at least one torsion member being coupled between the deck frame and the ramp member such that the ramp member is biased from at least one of the loading position and the storage position towards the intermediate position.

According to a second aspect of the present invention there is provided a trailer comprising:

a deck frame supporting a flat bed deck thereon;

a ramp member;

a hinge pivotally coupling the ramp member to the deck frame for pivotal movement about a hinge axis between a loading position in which the ramp member extends between the deck frame and the ground and a storage position in which the ramp member is raised upwardly in relation to the loading position, through an intermediate position in which the ramp member is between the loading position and the storage position;

at least one torsion member having a respective torsion axis extending in a longitudinal direction of the torsion member between opposed ends of the torsion member;

said at least one torsion member being arranged to be supported such that the torsion axis of said at least one torsion member extends generally in a direction of the hinge axis; and said at least one torsion member being coupled between the deck frame and the ramp member such that the ramp member is biased from at least one of the loading position and the storage position towards the intermediate position.

By providing a torsion member coupled between the deck frame and the ramp member, the ramp member can be lifted with greater biasing assist so that a single operator can easily handle the entire single ramp as substantially the full weight of the ramp can be supported by the torsion member. The torsion members can be arranged to provide sufficient biasing force that a single full ramp section may be provided which spans the full width of the trailer while still being easy to handle and operate by a single operator manually as the torsion members can accommodate the full weight of the a single integral ramp section even when the ramp weighs in excess of 500 pounds for example. Thus, use of a torsion member, in addition to being easier to operate, also permits a much safer ramp design as a single full ramp can be used effectively.

The single full ramp is operable as a full trailer width ramp surface so that vehicles with differently spaced front and rear wheels or vehicles with trailers in which the wheels of the vehicle and trailer have differently spaced wheels, can be loaded onto the deck surface of the trailer according to the present invention without adjusting configuration of the ramp. Alternatively, prior art designs having multiple ramp sections require adjustment of the width between the ramp sections when loading vehicles/trailers with inconsistent lateral wheel spacing. In addition to a single full ramp according to the present invention being operable as a full width ramp surface in the loading position, in the storage or transport position the full width ramp also has the advantage of providing a full width extension of the horizontal deck surface as a single integral member.

Use of a plurality of torsion rods bundled together to form each torsion member can increase the torsional range of motion of the torsion member so that torsion members can be arranged to fully balance the weight of the ramp member through a full range of motion of the ramp member from the loading position to a storage position supported on the deck. Use of torsion members also permits an open frame design for the ramps to minimize wind drag of the trailer during transport as compared to prior art designs of ramps for trailers.

Said at least one torsion member is preferably coupled between the deck frame and the ramp member such that the ramp member is biased from both the loading position and the storage position towards the intermediate position.

Two torsion members are preferably located spaced apart from one another, with each torsion member comprising a plurality of torsion rods bundled together to extend in the longitudinal direction of the torsion member. The torsion rods may comprise high tensile strength steel rods.

There may be provided a first torsion member biasing the ramp member from the storage position towards the intermediate position and a second torsion member biasing the ramp member from the loading position towards the intermediate position. The first torsion member may also bias the ramp member from the loading position towards the intermediate position such that both the first and second torsion members bias the ramp member from the loading position towards the intermediate position.

When one of the torsion members is anchored at one end relative to one of the deck frame or the ramp member, there may be provided a first crank member supported on the other end of the torsion member at the torsion axis, a second crank member anchored relative to the other one of the deck frame and the ramp member at the hinge axis, and a connecting member connected between the first and second crank members.

On the right hand side of the trailer, the first and second crank members comprise lever arms extending radially from the torsion axis and the hinge axis respectively with the connecting member comprising a flexible member connected between the lever arms at respective positions spaced radially outward from the respective axes.

On the left hand side of the trailers the first and second crank members comprise drums and the connecting member comprises a flexible tether anchored at opposing ends on the drums respectively such that the connecting member is wound onto the drums as the ramp member is pivotally displaced between respective positions.

Preferably, one of the first and second drums, or a portion thereof, varies in radial dimension about a circumference thereof.

When one of the torsion members biases the ramp member from both the storage position and the loading position towards the intermediate position, preferably the torsion member is flexed in a common direction of rotation as the ramp member is displaced into both the loading position and the storage position.

When the torsion member is anchored at the right hand side relative to one of the deck frame, there may be provided:

a first crank member supported on the other end of the torsion member at the torsion axis, the first crank member having a first portion and a second portion which differs in radial dimension from the torsion axis in relation to the first portion;

a second crank member anchored relative to the other one of the deck frame and the ramp member at the hinge axis;

a first connecting member connected between the first portion of the first crank member and the second crank member; and a second connecting member connected between the second portion of the first crank member and the second crank member.

The first and second portions of the first crank member may comprise drum surfaces onto which the first and second connecting members are wound respectively.

Preferably, the first and second connecting members engage diametrically opposed sides of the second crank member in relation to the hinge axis while engaging the first and second portions of the first crank member respectively on a common side of the torsion axis.

Preferably all of the connecting members comprise flexible members having a high tensile strength.

Preferably the ramp member comprises a single integral member arranged to span in a direction of the hinge axis substantially a full width of the deck frame.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a ramp system generally indicated by reference numeral 10. The ramp system 10 is particularly suited for use with a flat bed trailer 12 in which the ramp system 10 is supported at a rear end 14 of the trailer for loading objects and vehicles onto a flat upper deck surface 16 of the trailer.

Figure 1:
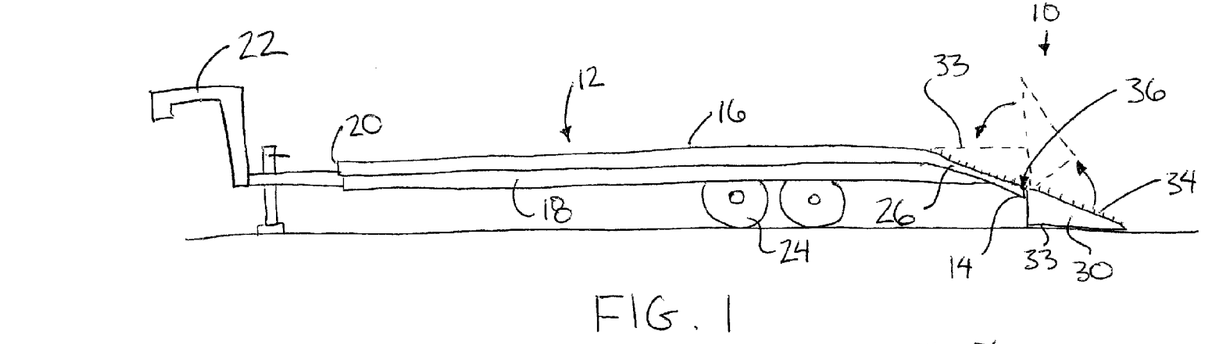
FIG. 1 is a side elevational view of a trailer upon which the ramp system is supported, shown in the loading position in solid line, and in both the storage and intermediate positions in broken line.
Figure 2:
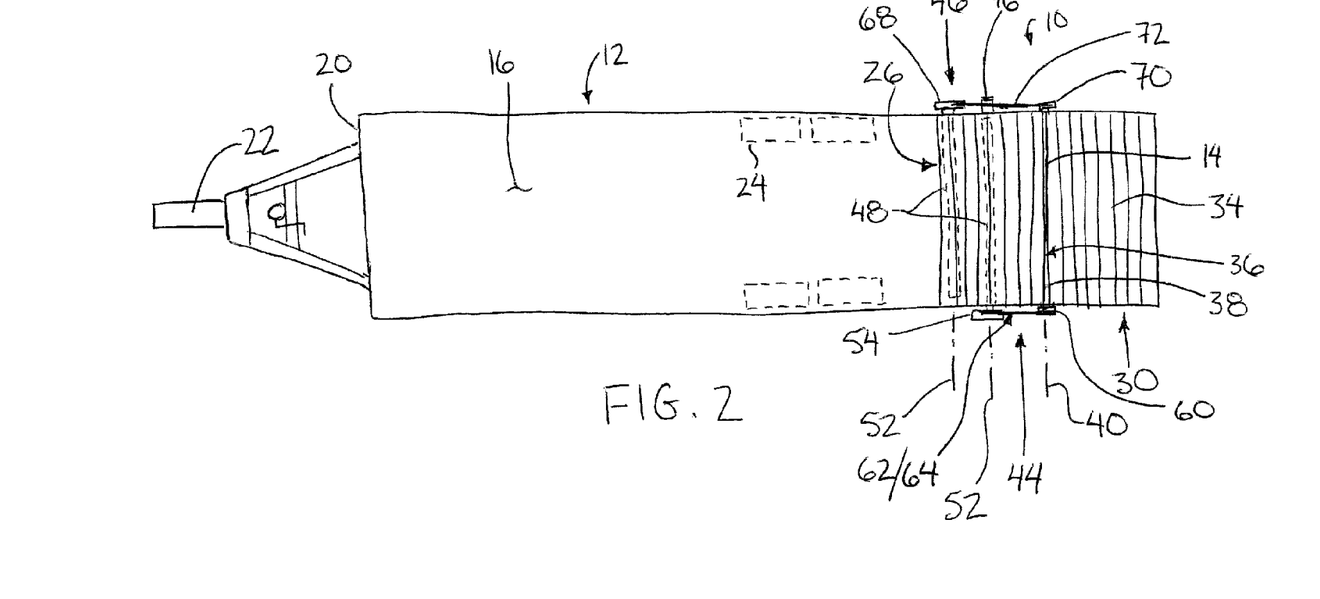
FIG. 2 is a top plan view of the trailer according to FIG. 1, shown in the loading position.

The trailer includes a deck frame 18 supporting the deck surface 16 thereon to extend in a longitudinal direction from a front end 20, locating a hitch connector 22 of the trailer, to the rear end 14. The deck frame 18 is supported on wheels 24 for forward rolling movement in the longitudinal direction when towed by a towing vehicle coupled to the trailer by the hitch connector 22. The deck surface 16 includes a ramp portion 26 adjacent the rear end of the trailer in which the flat horizontal deck surface is inclined downwardly and rearwardly to the rear end 14 of the trailer in fixed orientation relative to the deck frame 18.

Figure 3:
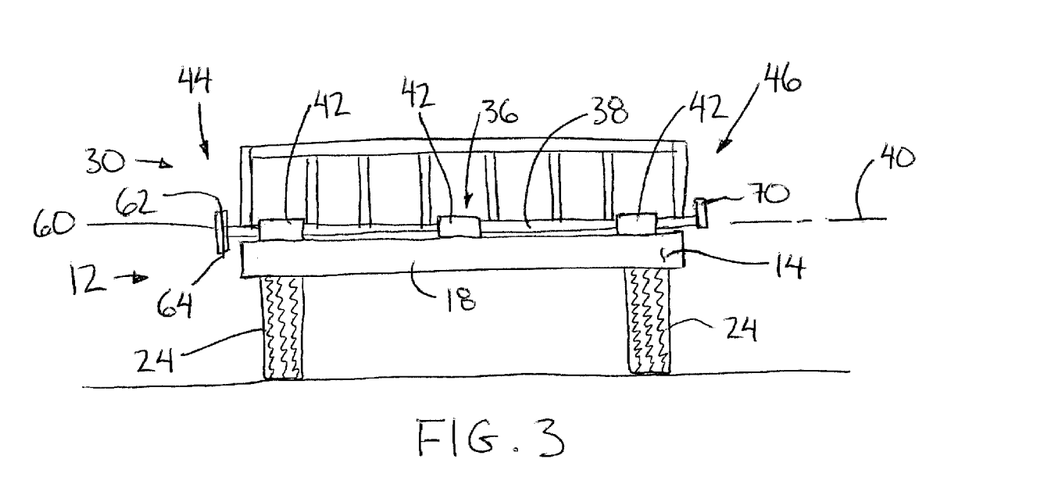
FIG. 3 is a rear elevational view of the trailer in the storage position.

The system 10 includes a ramp member 30 which spans laterally across the rear end 14 of the trailer. The ramp member 30 includes a single integral frame 32 which spans a full width of the trailer in the lateral direction across the rear end. The frame 32 is generally triangular in side elevation and defines an upper ramp surface 34 thereon which spans at a downward and rearward incline from the rear end 14 of the ramp portion 26 of the trailer to the ground in a loading position of the ramp member. In the loading position of the ramp member, the frame 32 includes a base 33 which spans horizontally a fully width of the trailer in both the loading and storage positions. In the storage position, the base 33 forms a flat deck surface which extends horizontally and substantially flush with a horizontal portion of the main deck surface of the trailer. Suitable structural members span vertically between the ramp surface 34 and the base 33 of the frame 32 to support the upper ramp surface 34 at an inclination above the ground in the loading position.

A hinge 36 couples the ramp member 30 pivotally to the rear end 14 of the deck frame of the trailer for pivotal movement from the loading position to a transport or storage position in which the ramp member is folded in relation to the ramp portion of the deck surface so that the ramp surface 34 of the ramp member extends at an upward and forward incline from the hinge 36 at the rear end 14 of the trailer so as to support the ramp member on the upper surface of the ramp portion of the deck of the trailer. The hinge 36 supports the ramp member for pivotal movement through a range of approximately 180 degrees from the loading position over center to the storage position through an intermediate position in which the ramp member extends generally upwardly partway between the loading and storage positions.

The hinge 36 generally comprises a shaft 38 which is integrally formed as part of the frame 32 of the ramp member and which extends along the hinge axis of the hinge. The hinge axis 40 is located at the rear end 34 of the deck frame and at the front top end of the ramp member in the loading position so as to extend horizontally in a lateral direction spaced above the ground. A plurality of collars 42 are fixed on the deck frame at laterally spaced positions across the rear end 14 thereof for rotatably receiving the shaft 38 of the ramp member frame therein. The ramp member is thus pivoted by rotating the shaft 38 of the ramp member frame within the collars 42 fixed on the deck frame A first lift mechanism 44 is provided at the left hand side of the trailer while a second lift assist mechanism 46 is provided at the right hand side of the trailer each for connection between the deck frame and the ramp member to bias the ramp member from one or both of the loading position and the storage position towards the intermediate position. Each lift assist mechanism relies on a torsion member 48 comprising a plurality of high tensile strength steel rods which are bundled together and supported within a surrounding support pipe 50 to providing biasing force. The pipe 50 maintains each torsion member 48 supported for torsional flexing about a respective elongate torsion axis 52 which extends generally horizontally in a lateral direction of the trailer, parallel to the hinge axis 40. Each of the torsion members 48 is anchored at one end in relation to the deck frame while the other end is coupled for rotational movement about the respective torsion axis responsive to pivotal movement of the ramp member about its respective hinge axis.

The first lift assist mechanism 44 incorporates a first one of the torsion members 48 to be coupled with the ramp member in such a manner that the first torsion member 48 biases the ramp member from both the loading position and the storage position towards the intermediate position. The second lift assist mechanism 46 incorporates a second one of the torsion members 48 to be coupled to the ramp member in such a manner that the second torsion member 48 only biases the ramp member from the loading position towards the intermediate position. In this arrangement the torsion members of both left and right hand lift assist mechanisms assist in raising the ramp member from the loading position towards the intermediate position however as less force is required to lift the ramp member from the storage position back to the intermediate position, the first torsion member of the first lift assist mechanism 44 is sufficient to bear the weight of the ramp member during displacement of the ramp member from the storage position.

Figure 4:
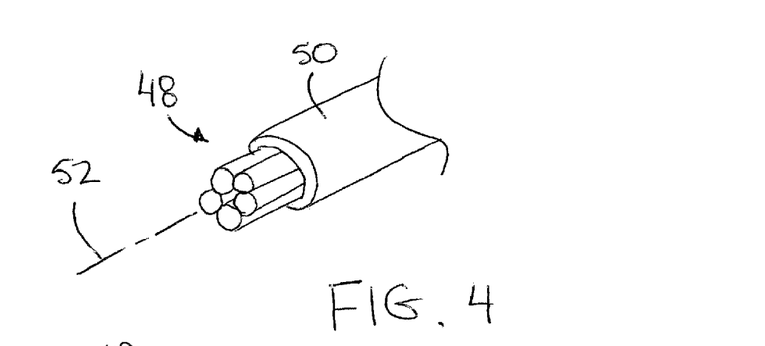
FIG. 4 is a perspective view of a first one of the torsion members.

The first torsion member 48 of the first assist lift mechanism 44 comprises a bundle of five torsion rods which are anchored at a right hand side of the trailer within the surrounding pipe 50 which is in turn anchored in relation to the deck frame. At the opposing left hand side of the trailer, the torsion member is free to rotate in relation to the right hand side and the deck frame so as to torsionially distort and flex the torsion member as the left hand side is rotated. The torsion member is supported below the deck surface 16 of the ramp portion 26 approximately at mid-length of the ramp portion in the longitudinal direction.

Figure 9:
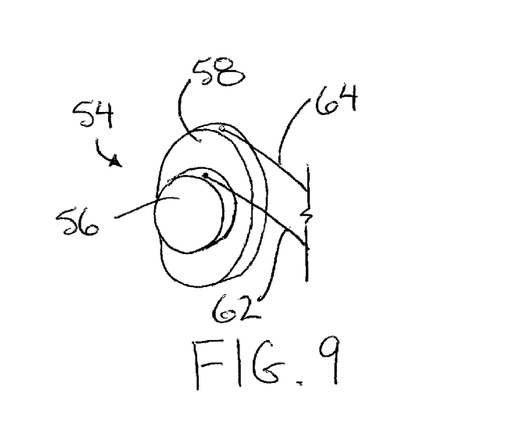
FIG. 9 is a perspective view of the first crank member.
Figure 10:
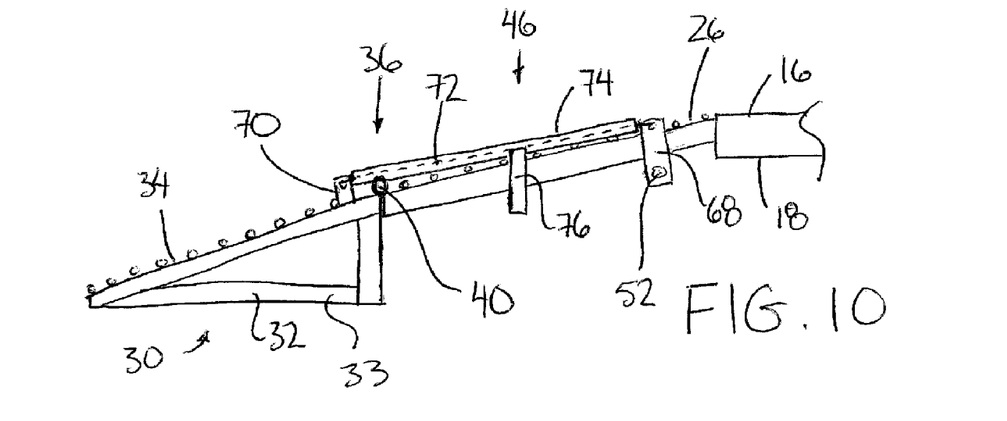
FIGS. 10, 11 and 12 are side elevational views of a second lift assist mechanism working in cooperation with the first lift assist mechanism and incorporating a second torsion member therein shown in the loading position, the intermediate position and the storage position respectively.
Figure 11:
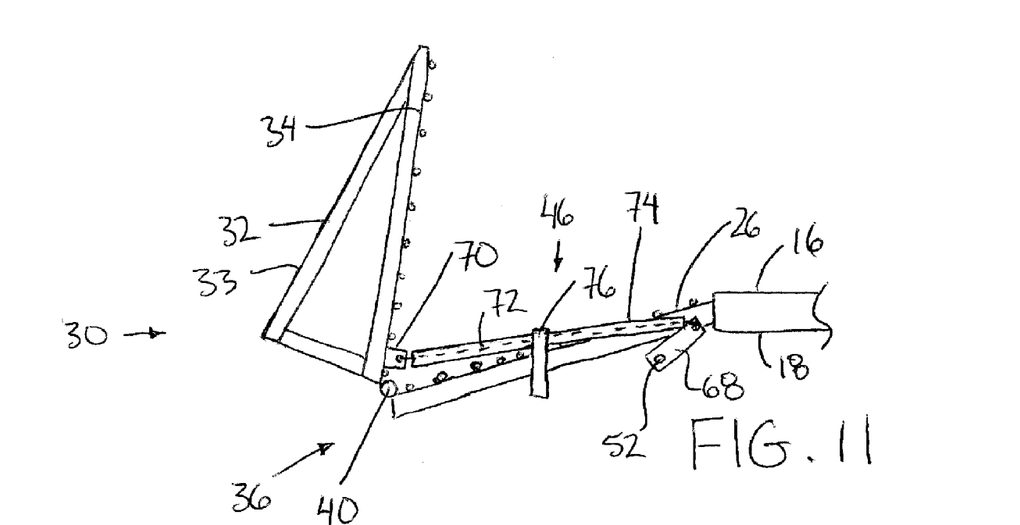
Figure 12:
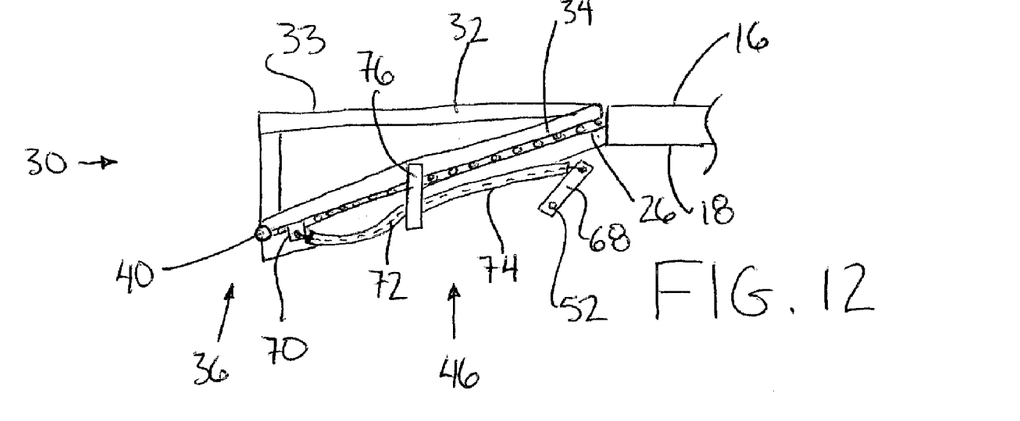

The first lift assist mechanism includes a first crank member 54 in the form of a drum which is fixed to the torsion member at the left hand side thereof for rotation with the left hand side of the torsion member relative to the deck frame. The crank member 54 comprises a drum having a first portion 56 having a constant diameter in relation to the respective torsion axis of approximately six and half inches. The drum forming the first crank member 54 also includes a second portion 58 which is spaced axially slightly from the first portion while remaining adjacent the left hand end of the first torsion member. The second portion 58 is increased in radial dimension in relation to the first portion 56.

The lift assist mechanism at the left hand side further includes a second crank member 60 also comprising a drum but which is fixed on the shaft 38 of the ramp member frame to rotate therewith and so as to be concentric with the hinge axis at the left hand side of the trailer. The second crank member 60 is a drum of constant diameter of approximately five and a half inches so as to be less in diameter than the first and second portions of the first crank member 54.

A first connecting member 62 comprises a flexible tether of high tensile strength cable so as to be wound onto the first portion 56 of the first crank member 54 adjacent top side thereof while being wound onto the drum forming the second crank member 60 also on the top side thereof at the opposing end of the connecting member.

A second connecting member 64, also comprising an elongate flexible tether formed of high tensile strength cable, is wound onto the second portion 58 of the first crank member 54 also on the top side thereof while being wound onto the drum forming the second crank member 60 at the bottom side thereof at an opposing side of the second connecting member.

In this arrangement the first and second connecting members are engaged onto the second crank member 60 at diametrically opposed sides thereof in relation to the hinge axis while the first and second connecting members engage the first crank member 54 on the same top side thereof in relation to the respective torsion axis about which the first crank member 54 is rotated. By providing a second crank member 60 which is smaller in diameter than either portions of the first crank member 54 the rate of rotation of the ramp member at the hinge axis is increased in relation to the rate of rotation of the first torsion member at its respective torsion axis to reduce the required degree of rotation of the first torsion member through pivoting movement of the ramp member between respective positions.

By providing a second portion which increases in radial dimension at the point of engagement with the connecting member as the ramp member approaches the loading position the biasing force is arranged to slightly decrease as the ramp reaches its final loading positions. This is beneficial as when performing the reverse operation and displacing the ramp member back towards the intermediate position from the loading position the resulting decreasing radial dimension at the point of engagement of the connecting member with the second portion 58 of the crank member serves to increase the biasing force through the first portion of movement where some additional lifting force is required.

By providing first and second connecting members which are connected to the same side of the first crank member in relation to its respective axis while being coupled on diametrically opposed sides of the second crank member 60 at its respective axis, the first torsion member is effectively torsionally flexed in the same direction of rotation when the ramp member is pivoted in two opposing directions from the intermediate position towards the loading position and the storage position respectively. The ratio of rotation of the first crank member and the second crank member is arranged such that displacement from the intermediate position to the loading position causes the torsion member of the first lift assist mechanism to torsionally deflected through a range of approximately 55 degrees, however the reduced dimension of the first portion 56 in relation to the second portion 58 of the first crank member results in the first torsion member being torsionally flexed to a lesser degrees through a range of only approximately 45 degrees when the ramp member is displaced from the intermediate position to the storage position.

The diametrically opposed connection of the connecting members to the second crank member also result in one of the connecting members being slack in both of the storage and loading positions. For instance when the first connecting member 62 is under tension between the first portion of the first crank member and the second crank member the first crank member is forced to rotate so that the distance between the connecting points of the second connecting member on the crank members respectively is reduced and the second connecting member is thus slack. A suitable elastic tether 66 is coupled between the connecting member and the diametrically opposed bottom side of the first crank member to guide the second connecting member out of harm's way.

Similarly when the second connecting member is under tension in the loading position, the tension applied between the first and second crank members by the second connecting member causes the connection points of the first connecting member on the first and second crank members to approach one another to produce some slack in the first connecting member. A similar elastic tether 66 is thus connected between the first connecting member and the bottom of the first crank member 54 opposite its engagement with the connecting members to draw the first connecting member out of harm's way when it is slack.

Figure 5:
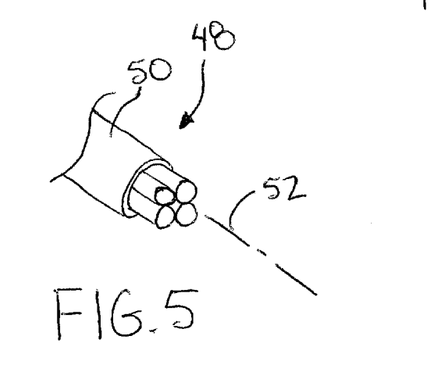
FIG. 5 is a perspective view of a second one of the torsion members.
Figure 6:
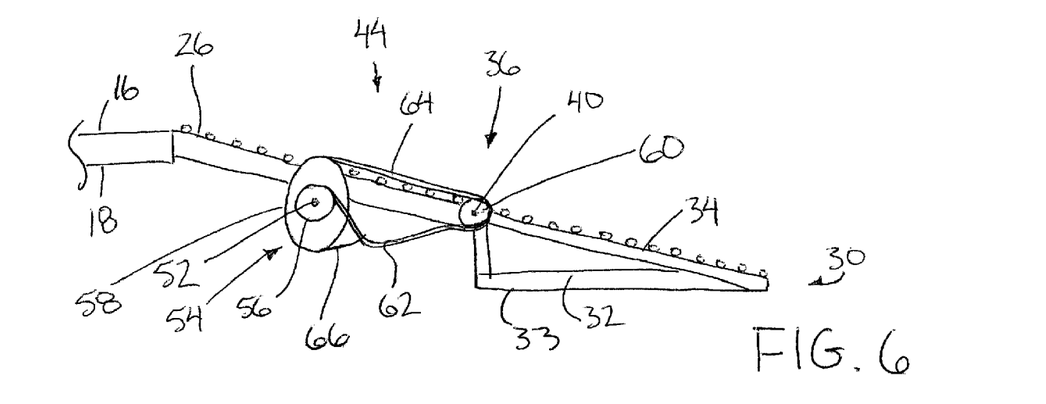
FIGS. 6, 7 and 8 are side elevational views of a first lift assist mechanism incorporating the first torsion member therein, shown in the loading position, the intermediate position and the storage position respectively.
Figure 7:
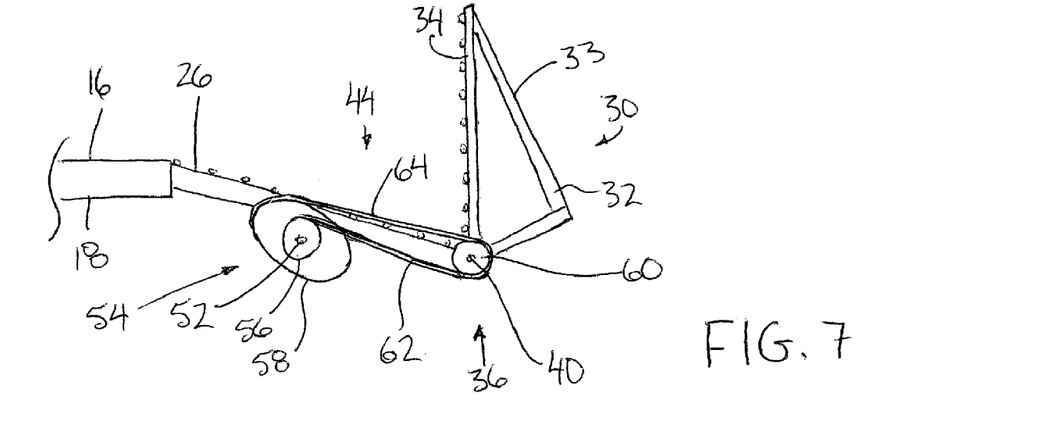
Figure 8:
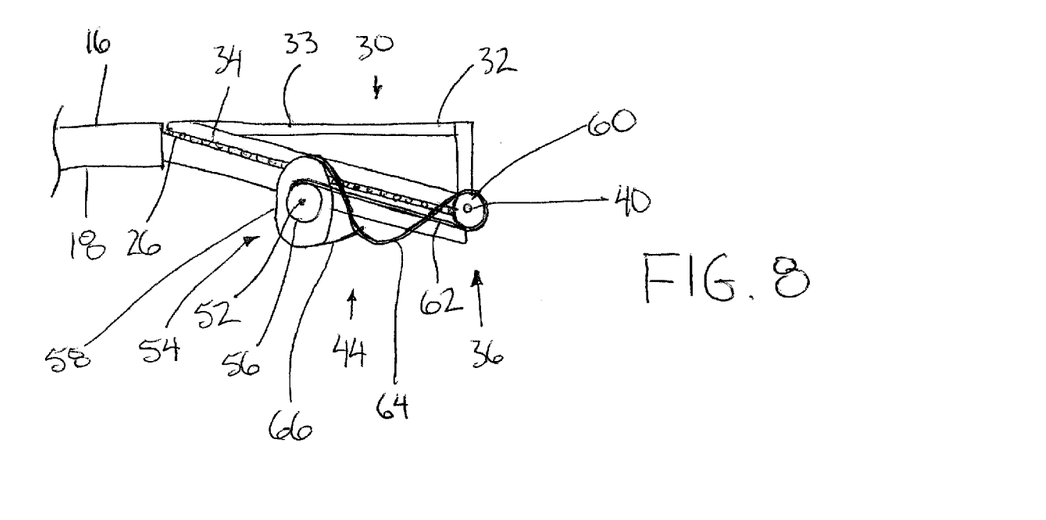

The second lift assist mechanism 46 is provided at the right hand side of the trailer and incorporates the second one of the torsion member 48 therein. The second torsion member comprises four rods which are bundled together within the respective pipe 50. The torsion member in the second lift assist mechanism is anchored at its left hand side in relation to the surrounding pipe and the deck frame upon which it is supported while the right hand end of the second torsion member is freely rotatable within the respective pipe 50 so as to cause the second torsion member to be torsionally flexed as the right hand side is rotated about the respective torsion axis in relation to the left hand side anchored in relation to the deck frame. The second torsion member 48 is supported below the deck surface 16 of the trailer 12 adjacent a forward end of the ramp portion 26 of the deck surface.

The second lift assist mechanism also includes a first crank member 68 which is fixed to the end of the torsion member 48 for rotation therewith in relation to the opposite end anchored in relation to the deck frame. The second crank member 68 comprises a lever arm which is rotatable about the respective torsion axis with the right hand end of the torsion member. The lever arm projects in a radially direction in relation to the torsion axis through a length of approximately eight inches at a forward and upward incline when the torsion member is unflexed.

The second lift assist mechanism also includes a second crank member 70 fixed on the end of the shaft 38 of the ramp member frame for rotation therewith. In the loading position of the ramp member, the lever arm forming the second crank member 70 extends at an upward and rearward incline from the hinge axis in the order of six inches.

A suitable connecting member 72 is connected between the free ends of the lever arms forming the first crank member 68 and the second crank member 70. The connecting member 72 comprises a flexible tether formed of a high tensile strength cable similarly to the connecting member of the first lift assist mechanism. Length of the connecting member 72 is set so that the connecting member remains slack as the ramp member is rotated between the storage position and the intermediate position. At the intermediate position, slack in the connecting member is eliminated and the connecting member then undergoes tension to torsionially flex the second torsion member as the ramp member is continued to be rotated from the intermediate position to the loading position.

The connecting member 72 includes a resilient sheath 74 which surrounds the high tensile strength cable so that when the connecting member is slack between the intermediate and storage positions, the resilient nature of the sheath 74 causes it to be reduced in length with the connecting member 72 bunched up therein. The sheath 74 is sufficiently resilient that it does not interfere with extension of the connecting member back to its full length under tension.

Orientation of the lever arm and the arrangement of the second crank member to be shorter in length than the first crank member causes the second torsion member to be torsionially flexed through a range of approximately seventy degrees about the respective torsion axis as the ramp member is displaced from the intermediate position to the loading position.

In addition to the resilient sheath accommodating some of the slack in the connecting member between the intermediate and storage positions, a suitable retainer bar 76 is mounted on the deck frame spaced laterally outwardly from the ramp portion of the deck to define a channel or gap therebetween which receives the connecting members 72 to support and somewhat contain the connecting member when it is slack, thus preventing the connecting member 72 from getting in the way of other operations.

In use when the ramp member is displaced from the intermediate position to the loading position, the first and second torsion members of the first and second lift assist mechanisms respectively are initially relaxed and under no torsion. Displacement of the ramp member to be pivoted downwardly into the loading position causes both torsion members to be flexed into their most flexed orientations once the ramp member reaches the loading position to maximize the biasing force available when subsequently lifting the ramp member back from the loading position towards the intermediate position.

As the ramp member is displaced away from the loading position, The initial reduced diameter of the second portion of the first crank member 54 causes an initial slight increase in biasing force as the lifting force required increases slightly through the initial range of motion of the ramp member, but once the ramp member surpasses a horizontally position and then is continued to be raised upwardly towards the intermediate position, the biasing force applied by the torsion members reduces as the amount of torsional deflection of both torsion members is reduced until substantially no biasing force is provided at the intermediate position when both torsion members are unflexed.

During this movement towards the intermediate position, the second connecting member 64 unwinds from the drum on the shaft of the ramp member to be permitted to be wound onto the second portion 58 of the first crank member 54 as the torsion force acts to return the first torsion member to a relaxed intermediate position. At the same time the first connecting member 62 is wound onto the drum at the hinge axis to remove its slack so that once the ramp member reaches the intermediate position the first connecting member 62 is thus under tension. Continued displacement towards the storage position causes the connecting member to be unwound from the first portion 56 of the first crank member 54 to return the first torsion member to a torsionially flexed position with increasing biasing force as the ramp member approaches the storage position.

While the first torsion member by itself provides sufficient biasing force to return the ramp member from the storage position to the intermediate position, once the ramp member reaches the intermediate position, slack is removed from the connecting member 72 of the second lift assist mechanism so that displacement of the ramp member from the intermediate position back to the loading position causes increasing torsional flexing of the second torsion member. The most biasing force is thus applied by the second torsion member in the loading position where most force is required for initially lifting the ramp member off of the ground into storage.

As described herein, the first and second lift mechanisms and their respective torsion members providing biasing force, cooperate together to provide a biasing force which substantially matches the moment applied to the ramp member by gravity so that a single operator can rotate the ramp member from the loading position through 180 degrees to the storage position and back with very little effort as substantially the full weight of the ramp member is counter-balanced by the torsion members through its full range of movement.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A ramp system for a flat bed trailer having a deck frame, the ramp comprising;
   a ramp member;
   a hinge pivotally coupling the ramp member to the trailer for pivotal movement about a hinge axis between a loading position in which the ramp member extends between the deck frame and the ground and a storage position in which the ramp member is raised upwardly in relation to the loading position, through an intermediate position in which the ramp member is between the loading position and the storage position;
   at least one torsion member having a respective torsion axis extending in a longitudinal direction of the torsion member between opposed ends of the torsion member;
   said at least one torsion member being arranged to be supported such that the torsion axis of said at least one torsion member extends generally in a direction of the hinge axis; and
   said at least one torsion member being coupled between the deck frame and the ramp member such that the ramp member is biased from at least one of the loading position and the storage position towards the intermediate position;
   wherein said at least one torsion member comprises a torsion member anchored at one end relative to one of the deck frame and the ramp member; and
   wherein there is provided:
      a first crank member supported on the other end of the torsion member at the torsion axis for rotation with the other end of the torsion member relative to said one end which is anchored to one of the deck frame and the ramp member, the first crank member comprising a lever arm projecting radially outward in relation to the torsion axis of the torsion member;
      a second crank member anchored relative to the other one of the deck frame and the ramp member at the hinge axis in fixed relation with the other one of the deck frame and the ramp member, the second crank member comprising a lever arm extending outwardly from the hinge axis; and
      a connecting member separate and independent from the torsion member which is connected between respective free ends of the lever arms forming the first and second crank members.

2. The ramp system according to claim 1 wherein said at least one torsion member is coupled between the deck frame and the ramp member such that the ramp member is biased from both the loading position and the storage position towards the intermediate position.

3. The ramp system according to claim 1 wherein said at least one torsion member comprises a plurality of torsion rods extending in the longitudinal direction of the torsion member and the torsion axis, the plurality of torsion rods being bundled together to form said at least one torsion member.

4. The ramp system according to claim 1 wherein said at least one torsion member comprises a plurality of torsion members spaced apart from one another, each torsion member comprising a plurality of torsion rods bundled together to extend in the longitudinal direction of the torsion member.

5. The ramp system according to claim 1 wherein said at least one torsion member comprises a first torsion member biasing the ramp member from the storage position towards the intermediate position and a second torsion member biasing the ramp member from the loading position towards the intermediate position.

6. The ramp system according to claim 1 wherein the first and second crank members comprise lever arms extending radially from the torsion axis and the hinge axis respectively, the connecting member comprising a flexible member connected between the lever arms at respective positions spaced radially outward from the respective axes.

7. The ramp system according to claim 1 wherein the first and second crank members comprise drums and the connecting member comprises a flexible tether anchored at opposing ends on the drums respectively such that the connecting member is wound onto the drums as the ramp member is pivotally displaced between respective positions.

8. The ramp system according to claim 7 wherein one of the first and second drums varies in radial dimension about a circumference thereof.

9. The ramp system according to claim 1 wherein said at least one torsion member comprises a torsion member biasing the ramp member from both the storage position and the loading position towards the intermediate position.

10. The ramp system according to claim 9 wherein the torsion member is flexed in a common direction of rotation as the ramp member is displaced into both the loading position and the storage position.

11. A ramp system for a flat bed trailer having a deck frame, the ramp comprising:

a ramp member;

a hinge pivotally coupling the ramp member to the trailer for pivotal movement about a hinge axis between a loading position in which the ramp member extends between the deck frame and the ground and a storage position in which the ramp member is raised upwardly in relation to the loading position, through an intermediate position in which the ramp member is between the loading position and the storage position;

at least one torsion member having a respective torsion axis extending in a longitudinal direction of the torsion member between opposed ends of the torsion member;

said at least one torsion member being arranged to be supported such that the torsion axis of said at least one torsion member extends generally in a direction of the hinge axis; and said at least one torsion member being coupled between the deck frame and the ramp member such that the ramp member is biased from at least one of the loading position and the storage position towards the intermediate position;

wherein said at least one torsion member comprises a torsion member biasing the ramp member from both the storage position and the loading position towards the intermediate position;

wherein the torsion member is flexed in a common direction of rotation as the ramp member is displaced into both the loading position and the storage position;

wherein the torsion member is anchored at one end relative to one of the deck frame and the ramp member; and wherein there is provided:

a first crank member supported on the other end of the torsion member at the torsion axis, the first crank member having a first portion and a second portion which differs in radial dimension from the torsion axis in relation to the first portion;

a second crank member anchored relative to the other one of the deck frame and the ramp member at the hinge axis;

a first connecting member connected between the first portion of the first crank member and the second crank member; and a second connecting member connected between the second portion of the first crank member and the second crank member.

12. The ramp system according to claim 11 wherein the first and second connecting members engage diametrically opposed sides of the second crank member.

13. The ramp system according to claim 11 wherein the first and second connecting members engage the first and second portions of the first crank member respectively on a common side of the torsion axis.

14. The ramp system according to claim 11 wherein the first and second connecting members comprise flexible members.

15. The ramp system according to claim 14 wherein the first and second portions of the first crank member comprise drum surfaces onto which the first and second connecting members are wound respectively.

16. The ramp system according to claim 1 wherein said at least one torsion member comprises at least one high tensile strength steel rod.

17. The ramp system according to claim 1 wherein the ramp member comprises a single integral member arranged to span in a direction of the hinge axis substantially a full width of the deck frame.

18. The ramp system according to claim 11 wherein the second portion of the first crank member increases in radial dimension at a point of engagement of the second portion with the second connecting member as the ramp member is displaced towards the loading position.

19. The ramp system according to claim 11 wherein the second crank member has a radial dimension which is smaller than either one of the first and second portions of the first crank member.

* * * * *